United States Patent [19]

Sichenzia

[11] 4,212,053
[45] Jul. 8, 1980

[54] D.C. TO D.C. CONVERTER UTILIZING RESONANT INDUCTOR TO NEUTRALIZE CAPACITIVE LOSSES

[75] Inventor: James Sichenzia, Massapequa Park, N.Y.

[73] Assignee: Venus Scientific Inc., Farmingdale, N.Y.

[21] Appl. No.: 929,284

[22] Filed: Jul. 31, 1978

[51] Int. Cl.² .......................................... H02M 1/14
[52] U.S. Cl. ...................................... 363/39; 363/16; 363/75
[58] Field of Search ........................... 363/15–16, 363/22–25, 39– 40, 47, 64, 75, 133–134; 323/60, 61; 333/32

[56] References Cited

U.S. PATENT DOCUMENTS

| | | | |
|---|---|---|---|
| 3,026,486 | 3/1962 | Pintell | 363/133 X |
| 3,209,240 | 9/1965 | Book | 323/60 |
| 3,239,750 | 3/1966 | Weber | 323/61 |
| 3,602,839 | 8/1971 | Williams | 363/132 X |
| 3,612,909 | 10/1971 | Imabayashi | 363/134 X |
| 3,654,537 | 4/1972 | Coffey | 363/16 X |
| 3,739,255 | 6/1973 | Leppert | 363/75 |

FOREIGN PATENT DOCUMENTS 2286542  4/1976  France ..................... 363/133

OTHER PUBLICATIONS

"Transistor Circuit Analysis" by Alfred D. Grommer, 1970, pp. 138–140.

Primary Examiner—J. D. Miller
Assistant Examiner—Peter S. Wong
Attorney, Agent, or Firm—Ostrolenk, Faber, Gerb & Soffen

[57] ABSTRACT

A d-c to d-c converter utilizing a resonant inductor to neutralize capacitive losses is disclosed. In most high voltage d-c power supplies, a step-up transformer is employed as the conversion element from the low voltage source to the high voltage output. Such transformers exhibit capacitive losses resulting from intra-and inter-winding capacitances. When utilizing a large step-up transformer wherein the turns ratio $n = N_p/N_s$ is much less than 1, the capacitive losses result in a sharp decrease in the load to source voltage ratio thereby reducing the power available to the load. The present invention compensates for these losses by providing a resonant inductor which forms, at the operating frequency of the transformer, a resonant circuit with the equivalent Thevenin capacitive reactance as viewed from the primary side of the transformer resulting from these losses.

9 Claims, 6 Drawing Figures

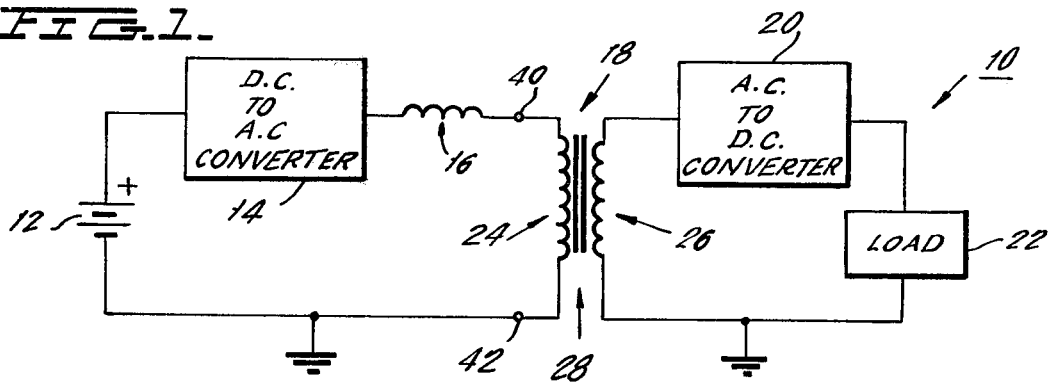
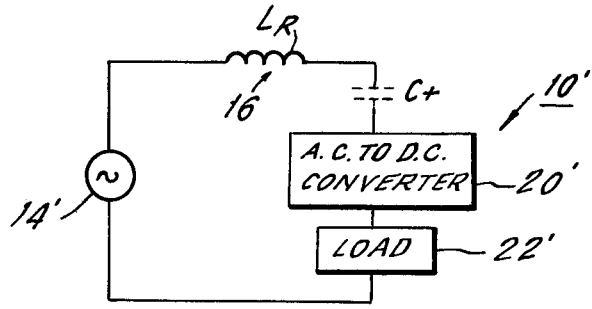
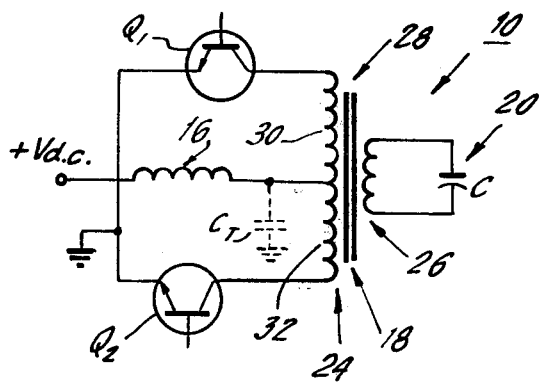
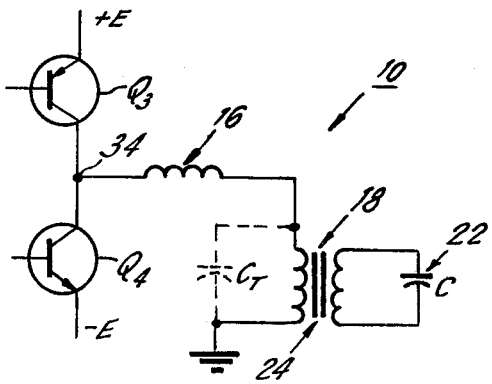
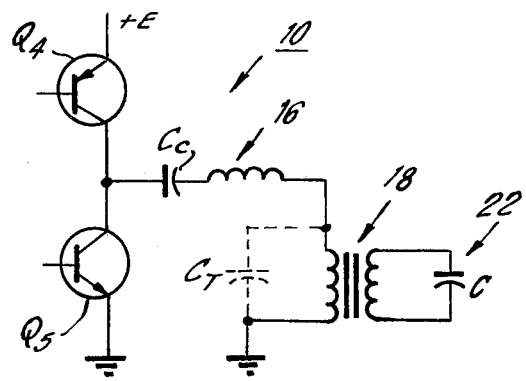
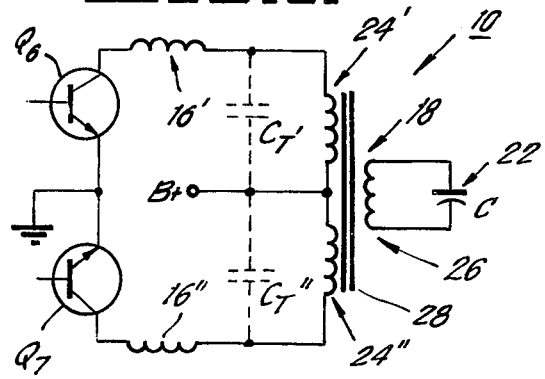

D.C. TO D.C. CONVERTER UTILIZING RESONANT INDUCTOR TO NEUTRALIZE CAPACITIVE LOSSES

BACKGROUND OF THE INVENTION

In most high voltage d-c power supplies, a step-up transformer is employed as the conversion element from the low voltage source to the high voltage output. In d-c power supplies of this type, a relatively low voltage d-c source is applied to a d-c to a-c converter which converts the d-c power to an alternating current which is applied to the primary winding of the step-up transformer. The a-c current in the primary winding of the transformer induces a relatively high voltage a-c output across the secondary winding of the transformer. This a-c output is applied to an a-c to d-c converter and then to a load.

To obtain maximum power input to the load, the transformer parameters should be chosen so that the load impedance is equal to the magnitude of the equivalent Thevenin impedance as seen from the load terminals. Since maximum power transfer occurs with a power factor of 1, the Thevenin impedance is preferably the complex conjugate of the load impedance. When determining these parameters, capacitive losses in the transformer are normally ignored. The resulting parameters are usually satisfactory since the capacitive losses in the transformer are minimal for low power and low frequency applications. When utilizing a large step-up transformer wherein the turns ratio $n = N_p/N_s$ is much less than 1, the capacitive losses have a significant effect on the equivalent Thevenin impedance as seen from the load terminal. As a result, the load to source voltage ratio is substantially reduced and substantially less power is available to the load.

The above-mentioned capacitive losses in the transformer are primarily due to inter-winding and inter-turn losses. The inter-turn capacitive losses exist within both the primary and second windings of the transformer. The parameters of these losses are determined by the location and spacing of the individual turns of the winding. The inter-winding losses appear between the secondary and primary windings and are also a function of the location and spacing of these windings. In both cases the value of the capacitive losses is affected by the dielectric constant of the material in which the windings are immersed. In most high voltage transformers, a potting compound having a high dielectric constant employed. As a result, the capacitive losses in these transformers are substantially increased.

SUMMARY OF THE INVENTION

In order to overcome the foregoing disadvantages, the present invention utilizes an inductor connected in series with the primary winding of the transformer to nullify the capacitive losses in the transformer. The parameters of the inductor are selected to form a resonant circuit with the capacitive losses at the operating frequency of the transformer. That is, since the impedance of both the capacitive losses and the inductor vary with frequency, the parameters must be chosen such that they define the complex conjugates of each other at the operating frequency of the transformer. In a preferred embodiment, the value of the inductor is selected to also take into account the capacitance of the load as viewed across the primary winding of the transformer. In this manner, the equivalent Thevenin impedance of the transformer as viewed across the load terminals will define the complex conjugate of the load impedance and maximum power transfer will be obtained.

BRIEF DESCRIPTION OF THE DRAWINGS

For the purpose of illustrating the invention, there is shown in the drawings several embodiments which are presently preferred; it being understood, however, that this invention is not limited to the precise arrangements and instrumentalities shown.

FIG. 1 is a schematic diagram of a d-c to d-c converter constructed in accordance with the principles of the present invention.

FIG. 2 is an equivalent circuit of the circuit of FIG. 1.

FIG. 3 is a circuit diagram of a first embodiment of the present invention.

FIG. 4 is a circuit diagram of the second embodiment of the present invention.

FIG. 5 is a circuit diagram of a third embodiment of the present invention.

FIG. 6 is a circuit diagram of a fourth embodiment of the present invention.

DETAILED DESCRIPTION OF THE PREFERRED EMBODIMENT

Referring now to the drawings wherein like numerals indicate like elements, there is shown in FIG. 1 a d-c to d-c converter constructed in accordance with the principles of the present invention and designated generally as 10. D-C converter 10 comprises a d-c power source 12, a d-c to a-c converter 14, a resonant inductor 16, a step-up transformer 18 and an a-c to d-c converter 20. The output of the a-c to d-c converter is applied across load 22.

Transformer 18 includes a primary winding 24 and a secondary winding 26. Windings 24 and 26 are each wound about a ferrite core 28 and have a turns ratio $n = N_p/N_s$ which is much less than 1. As viewed at terminals 40, 42 the transformer 18 and load 22 present a Thevenin equivalent capacitive reactance which serves to reduce the available power to load 22. The present invention overcomes this power loss by including a resonant inductor 16 which forms a resonant circuit with the Thevenin equivalent capacitance reactance.

The circuit of FIG. 1 may be reduced to the equivalent circuit 10' illustrated in FIG. 2. As shown therein, the d-c to d-c converter effectively includes an a-c power source 14', a resonant inductor 16, an equivalent capacitance $C_T$ and a purely resistive load 22'. The capacitance $C_T$ includes both the leakage capacitance in transformer 18 and the capacitive component of load 22 as reflected to the primary side of the transformer 18. The inductor 16 and capacitance $C_T$ form, at the operating frequency of the transformer 18, a resonant circuit having a power factor of 1 and and enabling maximum power transfer from the a-c source 14' to the resistive load 22'. Accordingly, the present invention enables a substantial increase in the load to source voltage ratio of the d-c to d-c converter 10 illustrated in FIG. 1.

Referring now to FIG. 3 there is shown a circuit diagram of a first embodiment of the present invention. As shown therein, transformer 18 includes a primary winding 24 having first and second parallel branches 30, 32 and a secondary winding 26. The secondary winding 26 is connected to load 20 which is shown as having a capacitive component C. The capacitive component of the load is reflected to the primary side of transformer 18 along with the capacitive losses of the transformer and is illustrated as a lumped capacitor $C_T$ which is coupled in parallel with the first and second branches 30, 32 of primary winding 24. A d-c voltage is applied to the center tap of primary winding 24 by the resonant inductor 16. The opposite ends of primary winding 24 are coupled to ground through transistors Q1 and Q2. Transistors Q1 and Q2 are alternately enabled at twice the operating frequency of transformer 18 so as to cause current to alternately flow through each of the parallel branches 30, 32 of primary winding 24. As a result, an alternating flux whose polarity reverses at twice the operating frequency of the transformer is induced in core 28 of transformer 18. The alternating flux in core 28 induces a relatively high a-c voltage across secondary winding 26 which is applied to load 20.

A second embodiment of the present invention is illustrated in FIG. 4. This embodiment utilizes a single primary winding and is therefore less expensive than the embodiment of FIG. 3. Since a single primary winding is utilized, means must be provided to apply an a-c current signal to winding 24. To this end, equal but opposite d-c voltages are applied to the emitters of transister Q3 and Q4, respectively. Gate impulses are alternately applied to the bases of transistors Q3 and Q4 with a frequency twice that of the operating frequency of transformer 18. As a result, an a-c voltage having a frequency equal to that of the operating frequency of transformer 18 appears at node 34. This a-c voltage is applied across primary winding 24 via resonant inductor 16. The parameters on inductor 16 are chosen to form a resonant circuit with the capacitance $C_T$ at the operating frequency of the transformer 18. As a result, a relatively large voltage appears at the secondary winding of transformer 18 and is applied to load 22.

A minor modification of the circuit of FIG. 4 is shown in FIG. 5. In this embodiment, a large coupling capacitor is provided in series with the inductor 16. As a result, it is possible to eliminate the negative power supply.

In the embodiment of FIG. 6, a separate resonant inductor 16', 16" is associated with each of two primary windings 24', 24'. The resonant inductor 16' is dimensioned to form a resonant circuit with the capacitance $C_T'$ which represents the reflected capacitance of the load 22 and that portion of transformer 18 associated with primary winding 24'. The resonant inductor 16" is dimensioned to form a resonant circuit with equivalent capacitance $C_T''$ which represents the reflected capacitance of load 22 and the capacitive losses of the transformer 18 associated with the primary winding 24". As in the previous embodiments, a gating pulse is alternately applied to the bases of transistors Q6, Q7 at a frequency twice that of the operating frequency of transformer 18 so as to induce a flux in core 28 which reverses in polarity at twice the frequency of the operating frequency of transformer 18. As a result, a relatively high alternating voltage appears across secondary winding 26 and is applied to load 22.

Although preferred embodiments of this invention have been described, many variations and modifications will now be apparent to those skilled in the art, and it is therefore preferred that the instant invention be limited not by the specific disclosure herein, but only by the appended claims.

What is claimed is:
1. A d-c to d-c converter comprising:
  a d-c power source;
  a step-up transformer having a primary winding, a secondary winding, and a core;
  means for applying said d-c power source to said primary winding in such a manner that the polarity of a flux induced in said core by said d-c source reverses at a predetermined frequency equal to twice the operating frequency of the transformer;
  a-c to d-c convertor means coupling said secondary winding to a load, said a-c to d-c convertor means being for converting an a-c signal appearing across said secondary winding into a d-c signal; and
  said means for applying said d-c power source to said primary winding including an inductor which forms, at said operating frequency of said transformer, a resonant circuit solely with the equivalent Thevenin capacitive reactance appearing across said primary winding.
2. The d-c to d-c convertor of claim 1 wherein said inductor is coupled between said d-c power source and the center tap of said primary winding and wherein said means for applying said d-c power source to said primary winding further includes:
  a first transistor coupled between a first end terminal of said primary winding and ground;
  a second transistor coupled between a second end of said primary winding and ground;
  means for alternately applying gating signals to said first and second transistors at a frequency equal to twice the operating frequency of said transformer.
3. The d-c to d-c convertor of claim 1 wherein said d-c power source generates both a positive and a negative d-c voltage and wherein said primary winding is coupled between a first terminal of said inductor and ground and wherein said means for applying said d-c power source to said primary winding further includes:
  a PNP transistor whose collector is coupled to a second terminal of said inductor and whose emitter is connected to said positive d-c voltage;
  an NPN transistor whose collector is coupled to said second terminal of said inductor and whose emitter is coupled to said positive d-c voltage; and
  means for alternately applying gating pulses to the bases of said NPN and PNP transistor at twice the operating frequency of said transformer.
4. The d-c to d-c convertor of claim 1 wherein said primary winding is coupled between a first terminal of said inductor and ground and wherein said means for applying said d-c power source to said primary winding further includes:
  a coupling capacitor having a first terminal coupled to a second terminal of said inductor and a second terminal coupled the collector of both an NPN and a PNP transistor, the emitter of said PNP transistor being coupled to said power source, the collector of said NPN transistor being coupled to ground; and
  means for alternately applying gating pulses to the bases of said NPN and said PNP transistors at twice the operating frequency of said transformer.
5. A d-c to d-c convertor, comprising:
  a d-c power source;
  a step-up transformer having first and second primary windings, a secondary winding, and a core, said first and second primary windings being coupled in parallel;

means for coupling said d-c power source to a common terminal of said first and second primary windings;

a first inductor having a first terminal coupled to a second terminal of said first primary winding, said first inductor forming, at an operating frequency of said transformer, a resonant circuit solely with the equivalent Thevenin capacitive reactance appearing across said first primary winding;

a second inductor having a first terminal coupled to a second terminal of said second primary winding, said second inductor forming, at said operating frequency of said transformer, a resonant circuit solely with the equivalent Thevenin capacitive reactance appearing across said second primary winding; and means for alternately grounding a second terminal of said first and second inductors at a frequency equal to twice said operating frequency of said transformer; and a-c to d-c convertor means coupling said secondary winding to a load, said a-c to d-c convertor means being for converting an a-c signal appearing across said secondary winding into a d-c signal.

6. A d-c to d-c convertor comprising:

a d-c power source;

a step-up transformer having a primary winding, a secondary winding, and a core;

means for applying said d-c power source to said primary winding in such a manner that the polarity of a flux induced in said core by said d-c source reverses at a predetermined frequency equal to twice the operating frequency of the transformer;

a-c to d-c convertor means coupling said secondary winding to a load, said a-c to d-c convertor means being for converting an a-c signal appearing across said secondary winding into a d-c signal; and said means for applying said d-c source to said primary winding including an inductor which forms, at said operating frequency of said transformer, a resonant circuit solely with a component of a capacitive reactance appearing across said primary winding and resulting from capacitive losses in said transformer.

7. The d-c to d-c convertor of claim 6 wherein said inductor is coupled between said d-c power source and the center tap of said primary winding and wherein said means for applying said d-c power source to said primary winding further includes:

a first transistor coupled between a first end terminal of said primary winding and ground;

a second transistor coupled between a second end of said primary winding and ground;

means for alternately applying gating signals to said first and second transistors at a frequency equal to twice the operating frequency of said transformer.

8. The d-c to d-c convertor of claim 6 wherein said d-c power source generates both a positive and a negative d-c voltage and wherein said primary winding is coupled between a first terminal of said inductor and ground and wherein said means for applying said d-c power source to said primary winding further includes:

a PNP transistor whose collector is coupled to a second terminal of said inductor and whose emitter is connected to said positive d-c voltage;

an NPN transistor whose collector is coupled to said second terminal of said inductor and whose emitter is coupled to said positive d-c voltage; and means for alternately applying gating pulses to the bases of said NPN and PNP transistor at twice the operating frequency of said transformer.

9. The d-c to d-c convertor of claim 6 wherein said primary winding is coupled between a first terminal of said inductor and ground and wherein said means for applying said d-c power source to said primary winding further includes:

a coupling capacitor having a first terminal coupled to a second terminal of said inductor and a second terminal coupled the collector of both an NPN and a PNP transistor, the emitter of said PNP transistor being coupled to said power source, the collector of said NPN transistor being coupled to ground; and means for alternately applying gating pulses to the bases of said NPN and said PNP transistors at twice the operating frequency of said transformer.

* * * * *